United States Patent
Fish, Jr. et al.

(10) Patent No.: US 10,723,270 B2
(45) Date of Patent: Jul. 28, 2020

(54) MECHANICAL TILT FOR FULL DISPLAY MIRROR WITH MOUNTING PLATE, TOGGLE UNIT AND ACTUATION PIN

(71) Applicant: Gentex Corporation, Zeeland, MI (US)

(72) Inventors: Richard T. Fish, Jr., Hudsonville, MI (US); Ulrich A. Kuester, Spring Lake, MI (US)

(73) Assignee: GENTEX CORPORATION, Zeeland, MI (US)

( * ) Notice: Subject to any disclaimer, the term of this patent is extended or adjusted under 35 U.S.C. 154(b) by 389 days.

(21) Appl. No.: 15/862,263

(22) Filed: Jan. 4, 2018

(65) Prior Publication Data
US 2018/0186293 A1    Jul. 5, 2018

Related U.S. Application Data

(60) Provisional application No. 62/442,197, filed on Jan. 4, 2017.

(51) Int. Cl.
| | |
|---|---|
| *B60R 1/04* | (2006.01) |
| *B60R 1/08* | (2006.01) |
| *B60R 1/12* | (2006.01) |
| *G02B 7/198* | (2006.01) |
| *B60R 11/00* | (2006.01) |

(52) U.S. Cl.
CPC ............. *B60R 1/086* (2013.01); *B60R 1/04* (2013.01); *B60R 1/12* (2013.01); *B60R 2011/0033* (2013.01); *G02B 7/198* (2013.01)

(58) Field of Classification Search
CPC .. G02B 7/198; B60R 1/04; B60R 1/08; B60R 1/083; B60R 1/086; B60R 2001/1215; B60R 2001/1253; B60R 2011/0033; B60R 2300/8026; B60R 2300/8046; B60R 2300/8066

USPC .......................... 359/605, 606, 844, 875, 877
See application file for complete search history.

(56) References Cited

U.S. PATENT DOCUMENTS

| | | |
|---|---|---|
| 3,467,465 A | 9/1969 | Van Noord |
| 5,956,181 A | 9/1999 | Lin |
| 6,321,159 B1 | 11/2001 | Nohtomi et al. |

(Continued)

FOREIGN PATENT DOCUMENTS

EP    1275559 B1    11/2003

OTHER PUBLICATIONS

Federal Institute of Industrial Property, "International Search Report and Written Opinion," dated May 31, 2018 (8 pages).

*Primary Examiner* — Ryan S Dunning
(74) *Attorney, Agent, or Firm* — Price Heneveld LLP; Bradley D. Johnson

(57) ABSTRACT

A rearview mirror for a vehicle includes a housing defining an interior cavity and an actuation mechanism coupled within the interior of the housing. The actuation mechanism includes an arcuate first track fixed with the housing. A mounting plate is rotatably coupled within the cavity of the housing at a first end thereof and defines a generally vertically arranged second track alignable with the first track. A toggle unit is coupled within the interior cavity of the housing and is rotatable about an axis between first and second positions. A first arm of the toggle unit extends from the toggle unit and defines an opening therein alignable with the first track and having two opposite, facing, cam surfaces extending away each other. The actuation mechanism further includes an actuation pin extending through the first track, the second track, and the opening.

20 Claims, 10 Drawing Sheets

(56) References Cited

U.S. PATENT DOCUMENTS

| | | | |
|---|---|---|---|
| 6,349,450 B1 | 2/2002 | Koops et al. |
| 6,520,667 B1 | 2/2003 | Mousseau |
| 6,648,477 B2 | 11/2003 | Hutzel et al. |
| 7,255,451 B2 | 8/2007 | McCabe |
| 7,329,013 B2 | 2/2008 | Blank et al. |
| 7,510,287 B2 | 3/2009 | Hook |
| 7,722,199 B2 | 5/2010 | DeWard et al. |
| 7,888,629 B2 | 2/2011 | Heslin et al. |
| 7,916,009 B2 | 3/2011 | Schofield et al. |
| 8,351,454 B2 | 1/2013 | Jain et al. |
| 9,041,806 B2 | 5/2015 | Baur et al. |
| 9,475,431 B2 | 10/2016 | Brummel et al. |
| 2002/0047378 A1 | 4/2002 | Bingle et al. |
| 2002/0159171 A1 | 10/2002 | Schnell et al. |
| 2003/0137757 A1 | 7/2003 | Wachi |
| 2004/0148102 A1 | 7/2004 | McCarthy et al. |
| 2004/0263988 A1 | 12/2004 | Lin |
| 2005/0248847 A1 | 11/2005 | Weimer |
| 2006/0050018 A1 | 3/2006 | Hutzel et al. |
| 2007/0279756 A1 | 12/2007 | Rosario et al. |
| 2008/0049344 A1 | 2/2008 | DeWard |
| 2008/0055757 A1 | 3/2008 | Uken et al. |
| 2008/0077882 A1 | 3/2008 | Kramer et al. |
| 2008/0225538 A1 | 9/2008 | Lynam et al. |
| 2009/0040306 A1 | 2/2009 | Foote et al. |
| 2010/0046104 A1 | 2/2010 | Rimac |
| 2010/0085653 A1 | 4/2010 | Uken et al. |
| 2011/0176323 A1 | 7/2011 | Skiver et al. |
| 2011/0188122 A1 | 8/2011 | Habibi et al. |
| 2013/0279014 A1 | 10/2013 | Fish, Jr. et al. |
| 2014/0347488 A1 | 11/2014 | Tazaki et al. |

MECHANICAL TILT FOR FULL DISPLAY MIRROR WITH MOUNTING PLATE, TOGGLE UNIT AND ACTUATION PIN

CROSS-REFERENCE TO RELATED APPLICATION

This application claims priority under 35 U.S.C. § 119(e) to U.S. Provisional Application No. 62/442,197, filed Jan. 4, 2017, entitled "MECHANICAL TILT FOR FULL DISPLAY MIRROR," the disclosure of which is hereby incorporated herein by reference in its entirety.

TECHNOLOGICAL FIELD

The present disclosure relates generally to a rearview mirror for a motor vehicle and, more particularly, relates to a mechanism for movement of a reflective surface of the mirror substrate through a predetermined angle.

BACKGROUND

Various types of rearview mirrors can be used in connection with vehicle interiors. In general, rearview mirrors are mounted adjacent the windshield either by attachment with the windshield or to an internal component adjacent the headliner. Such attachment is, for example, achieved by a mounting that couples with an actuation mechanism internal to the mirror housing. A substrate is affixed with the mirror housing and is generally configured to present an image of the view to the rear of the vehicle and, accordingly, may be adjustable by movement of the housing about the mounting structure.

In the case of a standard rearview mirror, the substrate is often a prism-type mirror that provides for a viewing angle at which the substrate reflects the rearward view of the mirror with a reduced luminosity to provide a dimming effect useful when driving at night, for example. In such an embodiment, the dimmed viewing angle for the substrate may be at a predetermined angle upward (i.e. toward the headliner) relative to the "normal" viewing angle. To achieve such positioning, rearview mirrors include various types of actuation mechanisms to provide for user control in repositioning of the substrate. Such movement can be achieved by manipulation of a lever, which can cause the actuation mechanism to move between stable positions, thereby causing movement of the substrate through a predetermined angle relative to the mounting structure that appropriately positions the substrate in a corresponding viewing position. Further, the actuation mechanism can couple with the mounting to allow general adjustment of the housing and substrate with respect to the driver for viewing of the image viewable on the substrate. In this manner, the actuation mechanism can allow the substrate to toggle between the stable viewing positions without changing the positions themselves such that the substrate provides generally the same view in the night mode as has been selected for the standard mode.

Some existing actuation mechanisms achieve movement between the above-referenced stable positions by way of a resiliently deformable spring plate. In general, such spring plates include a bent section to provide an area of flexation that accommodates movement of components within the actuation mechanism. The spring force achieved by such flexation can urge the actuation mechanism to one of the stable positions. These types of structures, while providing biasing forces toward both stable positions, may provide force in the directions toward and away from the stable positions in varying amounts. In particular, the shape of the bent portion or portions may serve to secure the mechanism in one of the stable positions, including making it less susceptible to unintended movement out of such position by a force applied on the mirror housing, for example. However, in the opposite position, the mechanism may be susceptible, depending on the particular spring force and other internal forces, to inadvertent movement out of the stable position, which may be caused by a user adjusting the position of the mirror by grasping and moving the housing. In the case of a standard prism mirror, such inadvertent actuation may be inconvenient. Accordingly, further advances may be desired.

SUMMARY

According to an aspect of the disclosure, a rearview mirror for a vehicle includes a housing defining an interior cavity and an actuation mechanism coupled within the interior of the housing. The actuation mechanism includes a first track fixed with the housing and extending along an arcuate path between first and second ends. A mounting plate is rotatably coupled within the cavity of the housing at a first end thereof and defines a second track having a first end alternately alignable with the first end and the second end of the first track. A second end of the second track is alignable with an apex of the arcuate path. A toggle unit is coupled within the interior cavity of the housing and is rotatable about an axis between first and second positions. A first arm of the toggle unit extends from the toggle unit and defines an opening therein having a resting end alignable with the first end of the second track and two opposite, facing, cam surfaces extending away from the first end. The actuation mechanism further includes an actuation pin extending through the first track, the second track, and the opening.

According to another aspect, a mirror actuation mechanism includes a support body defining a first track extending along an arcuate path between first and second ends and a mounting plate rotatably coupled with the support body at a first end thereof and defining a second track having a first end alternately alignable with the first end and the second end of the first track and a second end alignable with an apex of the arcuate path. The actuation mechanism further includes a toggle unit rotatably fixed with respect to the support body and rotatable about an axis between first and second positions. A first arm extends from the toggle unit and defines an opening therein having a resting end alignable with the first end of the second track and two opposite, facing cam surfaces extending away from the first end. An actuation pin extends through the first track, the second track, and the opening.

According to another aspect, a rearview mirror for a vehicle includes a substrate having a reflective surface thereon and an actuation mechanism including a support body coupled with the substrate opposite the reflective surface and defining a first track extending along an arcuate path between first and second ends. The actuation mechanism further includes a mounting plate rotatably coupled within the cavity of the housing at a first end thereof and defining a second track having a first end alternately alignable with the first end and the second end of the first track and a second end alignable with an apex of the arcuate path. A toggle unit is coupled within the interior cavity of the housing and is rotatable about an axis between first and second positions. A first arm extends from the toggle unit and defines an opening therein having a resting end alignable with the first end of the second track and two opposite, facing cam surfaces extending away from the first end. An actuation pin extending through the first track, the second track, and the opening.

These and other features, advantages, and objects of the present device will be further understood and appreciated by those skilled in the art upon studying the following specification, claims, and appended drawings.

DETAILED DESCRIPTION OF EMBODIMENTS

Figure 1:
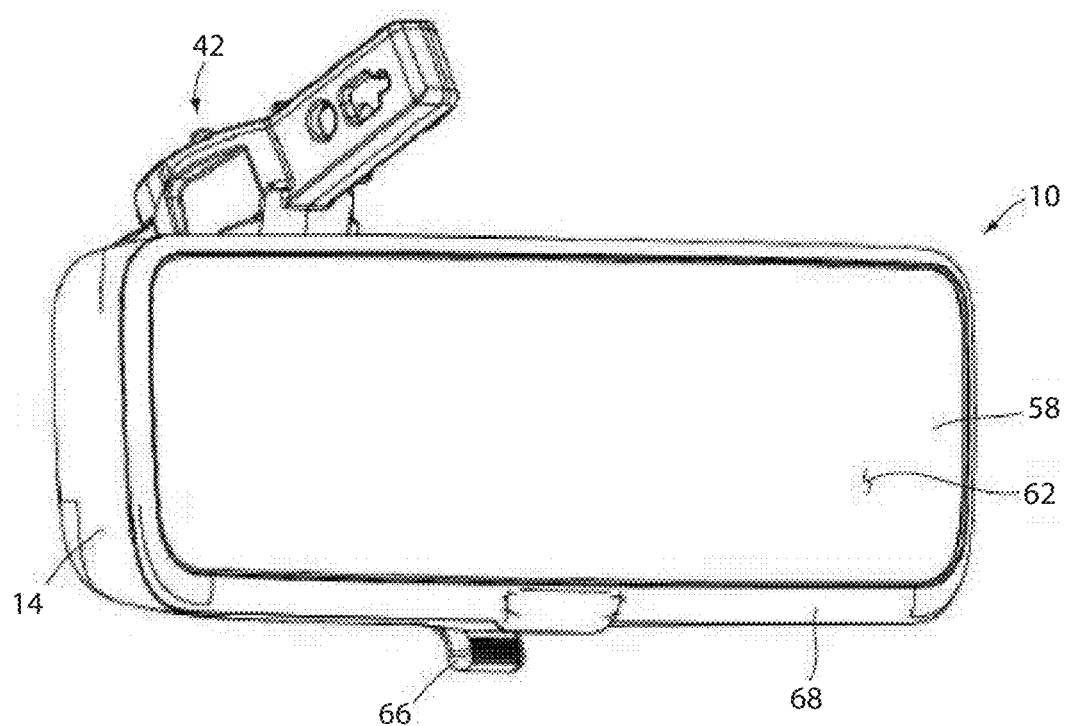
FIG. 1 is a perspective view of a rearview mirror assembly according to an aspect of the disclosure.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-12, reference numeral 10 generally designates a rearview mirror useable within a vehicle 12. The rearview mirror 10 includes a housing 14 defining an interior cavity 16 and an actuation mechanism 18 coupled within the interior of the housing 14. The actuation mechanism 18 has a first track 20 fixed with the housing 14 and extending along an arcuate path between first 22 and second ends 24. A mounting plate 26 is rotatably coupled within the interior cavity 16 of the housing 14 at a first end 22 thereof and defines a second track 30 having a first end 32 alternately alignable with the first end 22 or the second end 24 of the first track 20 and a second end 34 alignable with an apex 36 of the arcuate path. The actuation mechanism 18 further includes a toggle unit 38 coupled within the interior cavity 16 of the housing 14 and rotatable about an axis 40 between first and second positions. A first arm 42 extends from the toggle unit 38 and defines an opening 44 therein having a resting end 46 alignable with the first end 32 of the second track 30 and two opposite, facing cam surfaces 48 and 50 extending away from the resting end 46. An actuation pin 52 extends through the first track 20, the second track 30, and the opening 44.

Figure 2:
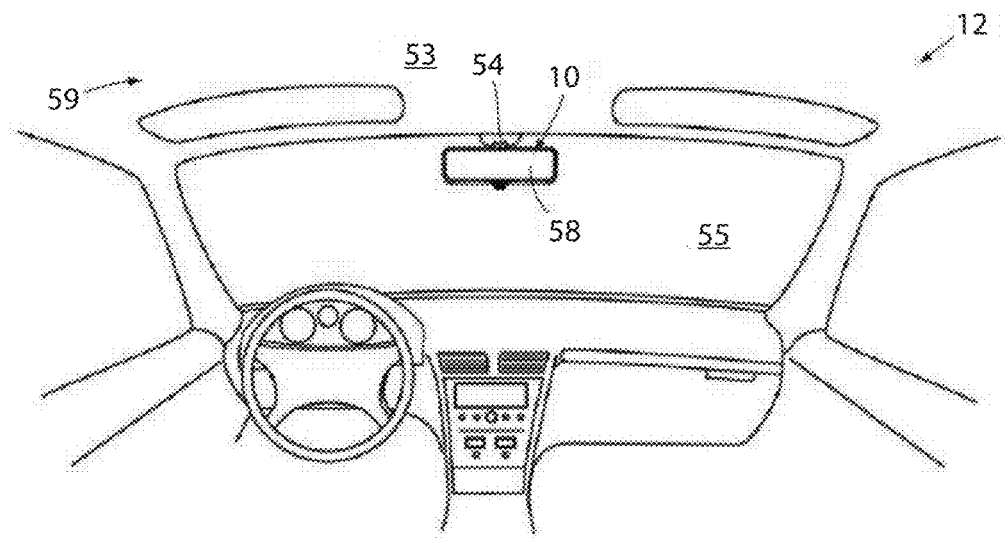
FIG. 2 is a perspective view of an interior of a vehicle including the rearview mirror assembly of FIG. 1.

As shown in FIG. 2, rearview mirror 10 can be used in connection with a vehicle interior 59. In particular, rearview mirror 10 can be mounted adjacent a windshield 55 of vehicle 12 either by attachment with the windshield 55 itself or to an internal component adjacent headliner 53 (which may include a portion of the vehicle frame, a vehicle panel, or other support structure, for example). Such attachment is achieved by a mounting arm 54 that is coupled with vehicle 12, as described, and couples with actuation mechanism 18, as explained further below, by extending through an opening 56 in housing 14. Opposite opening 56, a substrate 58 is positioned over an open side 70 of housing 14. Substrate 58 is generally configured to present an image (reflected or video, as described below) to a driver of vehicle 12 of the view to the rear of vehicle 12 and, accordingly, may be adjustable by movement of housing 14 with respect to mounting arm 54. In one embodiment, substrate 58 can be in the form of a prism mirror substrate of a generally transparent material having a tapered shape and an internal reflective surface. In this manner, the above-described rotation of toggle unit 38 can, as described further below, cause rotation of housing 14 and substrate 58 between a downwardly-angled position, in which the image reflected off of the highly-reflective surface is oriented toward the rear of the vehicle 12 so as to be visible to the driver, and an upwardly-directed position, in which the highly-reflective surface reflects an image of the headliner 53, the outer, polished surface reflecting an image toward the rear of the vehicle 12. In general, this arrangement allows for separate day and night modes in which the upwardly-directed position presents a dimmer image to the driver, by way of the polished surface instead of the mirror surface.

In another embodiment, substrate 58 may include a video display along a portion or an entirety thereof such that rearview mirror 10 is what may be referred to as a full-display mirror. Substrate 58, when including such a display, may be referred to herein as "display substrate 58" and may be capable of displaying a mirror-image of the view to the rear of vehicle 12 (that may be captured by an appropriately-positioned video camera or the like) when the display is in an active state. Such an image may generally replicate that which would be available from a typical reflective mirror and can be supplemented with other information presented on display substrate 58. In combination with such display substrate 58, a reflective surface 62 may be applied so as to overlie the display as a coating or separate element having properties to both provide a reflected image as well as to permit a video image of display substrate 58 to be visible therethrough.

The presence of reflective surface 62 permits substrate 58 to be used as a standard rearview mirror (i.e. without the need to view the displayed image) when the display is inactive, which may occur when the related vehicle 12 is not running or when power to the display substrate 58 is interrupted, for example. When in the active state, however, the presence of the reflective surface 62 over display substrate 58 can cause the image reflected by reflective surface 62 to compete with an image presented on display substrate 58. To alleviate such image competition, substrate 58 can be positioned such that reflective surface 62 reflects an image of the headliner 53 toward the driver. Because vehicle headliners are of generally consistent, non-reflective material, such an image may compete less with the video image of display substrate 58.

Rearview mirror 10, by way of the actuation mechanism 18, including toggle unit 38, can allow for a user to control repositioning of substrate 58 between the above-described downwardly- and upwardly-directed positions for the desired use of mirror 10, depending on the type of substrate 58. Such movement can be achieved by manipulation of lever 66 between the first position, shown in FIGS. 3-7, for example, to the second position, shown in FIGS. 8-10, which can cause actuation mechanism 18 to change from a first stable configuration (FIGS. 3-7) to a second stable configuration (FIGS. 8-10), which in turn causes movement of housing 14 and substrate 58 through a predetermined angle relative to mounting arm 54. In an example, such movement can be through an upward (i.e. toward headliner 53) angle 64 of between about 5° and 10°, and in one embodiment about 7°.

Figure 6:
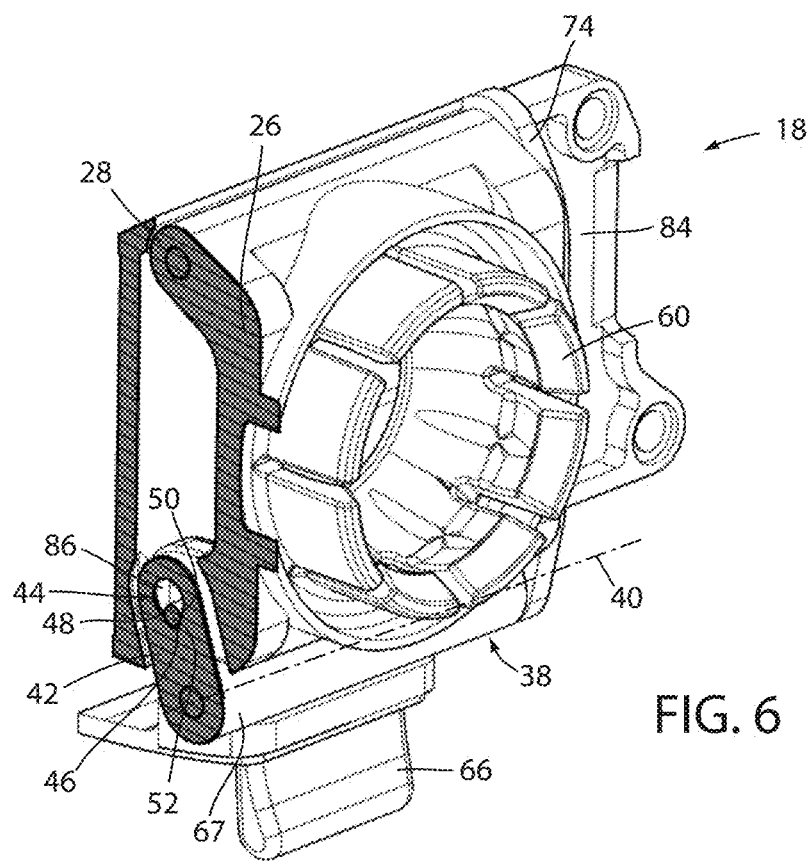
FIG. 6 is a perspective section view of the actuation mechanism.
Figure 7:
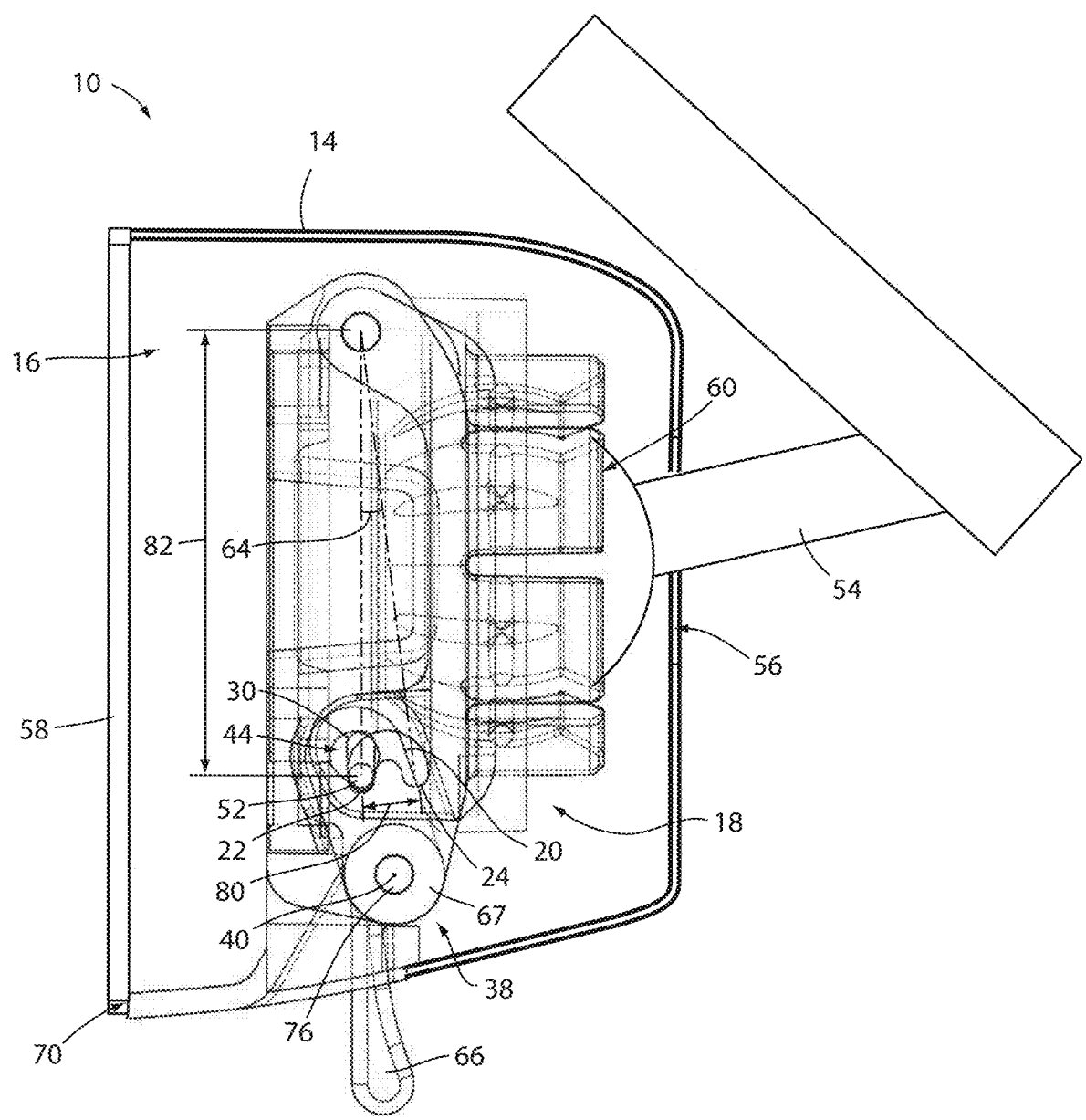
FIG. 7 is a partial section view showing an overlay of the various components of the actuation mechanism.
Figure 8:
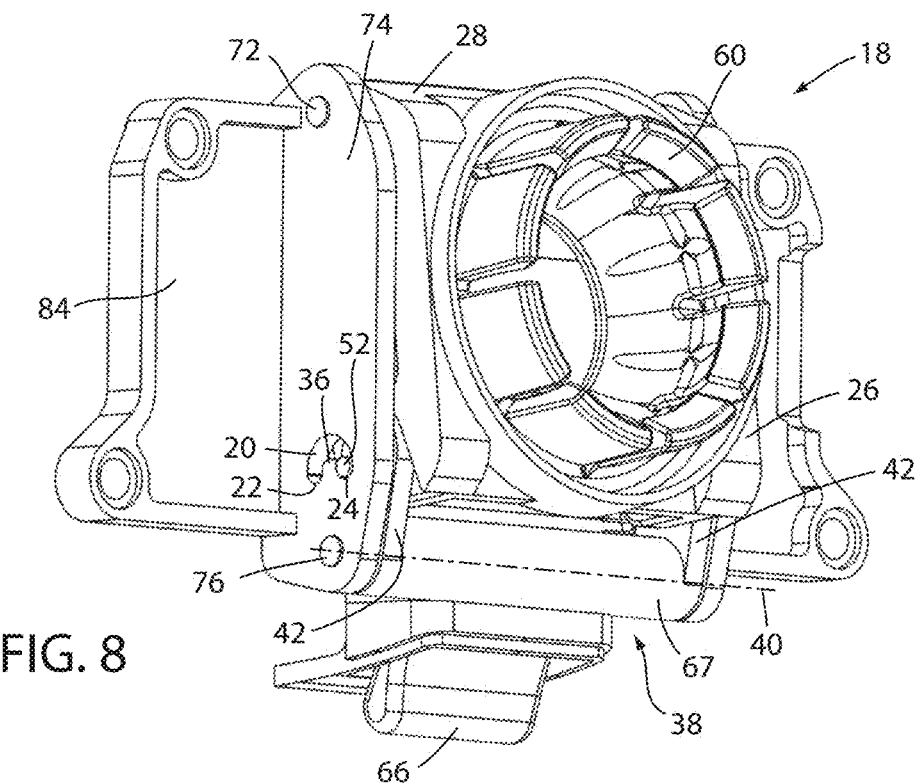
FIG. 8 is a front perspective view of the actuation mechanism after movement thereof into an alternate stable condition.
Figure 9:
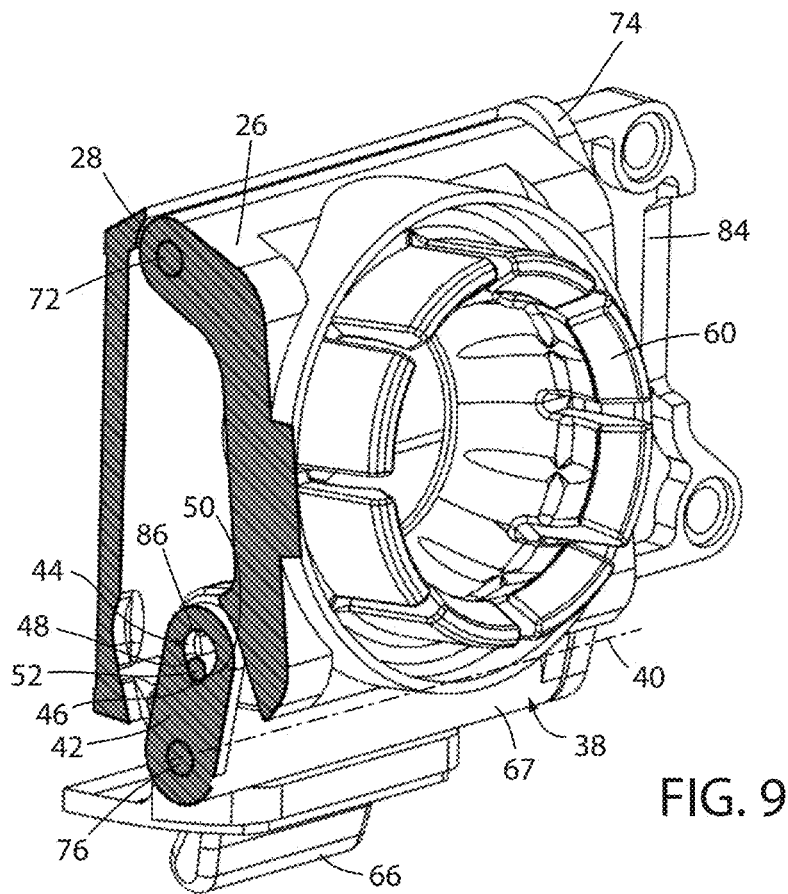
FIG. 9 is a perspective section view of the actuation mechanism in the alternate stable condition.

As shown in the cross-section views of FIG. 7, mounting arm 54 can couple with actuation mechanism 18 by articulating attachment with mounting plate 26 (FIG. 6) thereof by a ball and socket coupling 60. This arrangement can allow for the above-mentioned general adjustment of substrate 58 so as to position substrate 58 as desired with respect to the driver for viewing of the image viewable on substrate 58 in, for example a "day" mode. As described further below, movement of lever 66 from the first position to the second position, for example, can cause movement of housing 14 relative to mounting plate 26, while mounting plate 26 remains generally static. Such a configuration can allow substrate 58 to toggle between the positions for substrate 58 provided by the above-referenced stable conditions of actuation mechanism 18 without changing the positions themselves.

Figure 3:
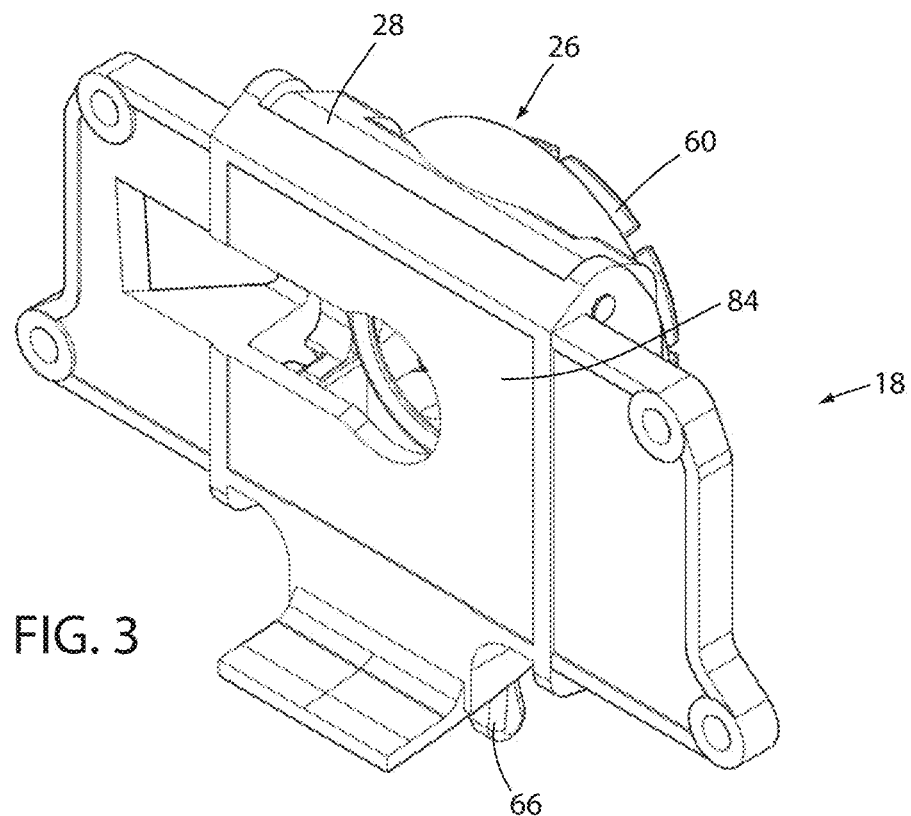
FIG. 3 is a rear perspective view of an actuation mechanism included in the rearview mirror of FIG. 1.
Figure 4:
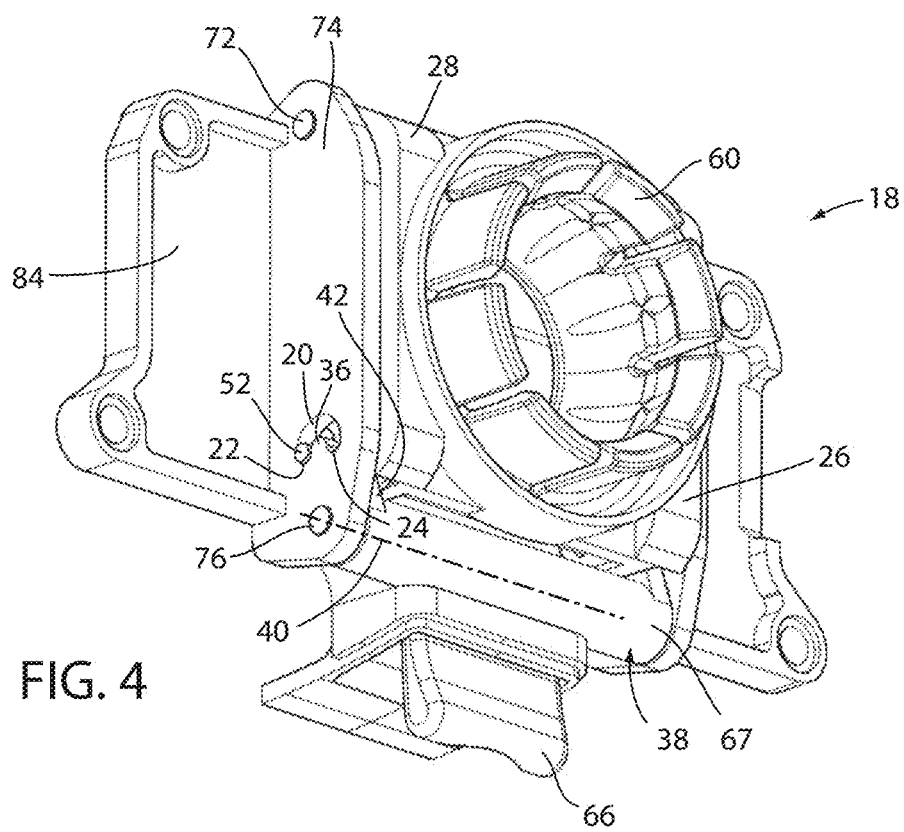
FIG. 4 is a front perspective view of the actuation mechanism.
Figure 5:
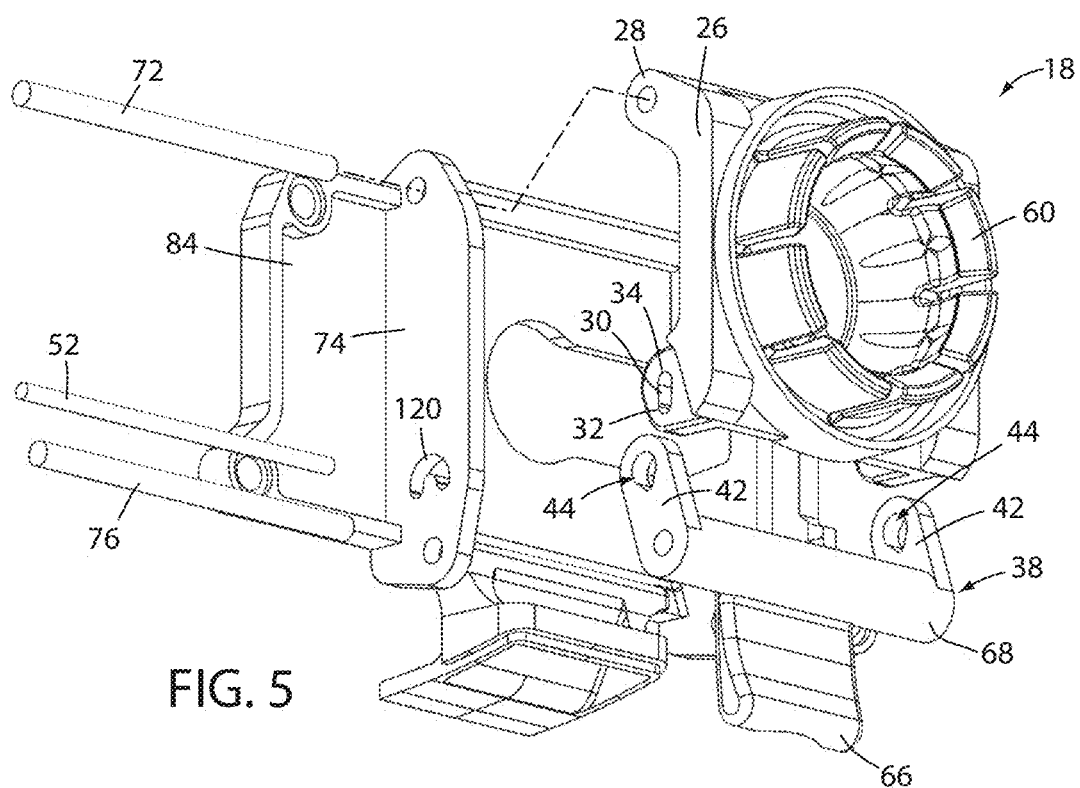
FIG. 5 is an exploded view of the actuation mechanism.
Figure 10:
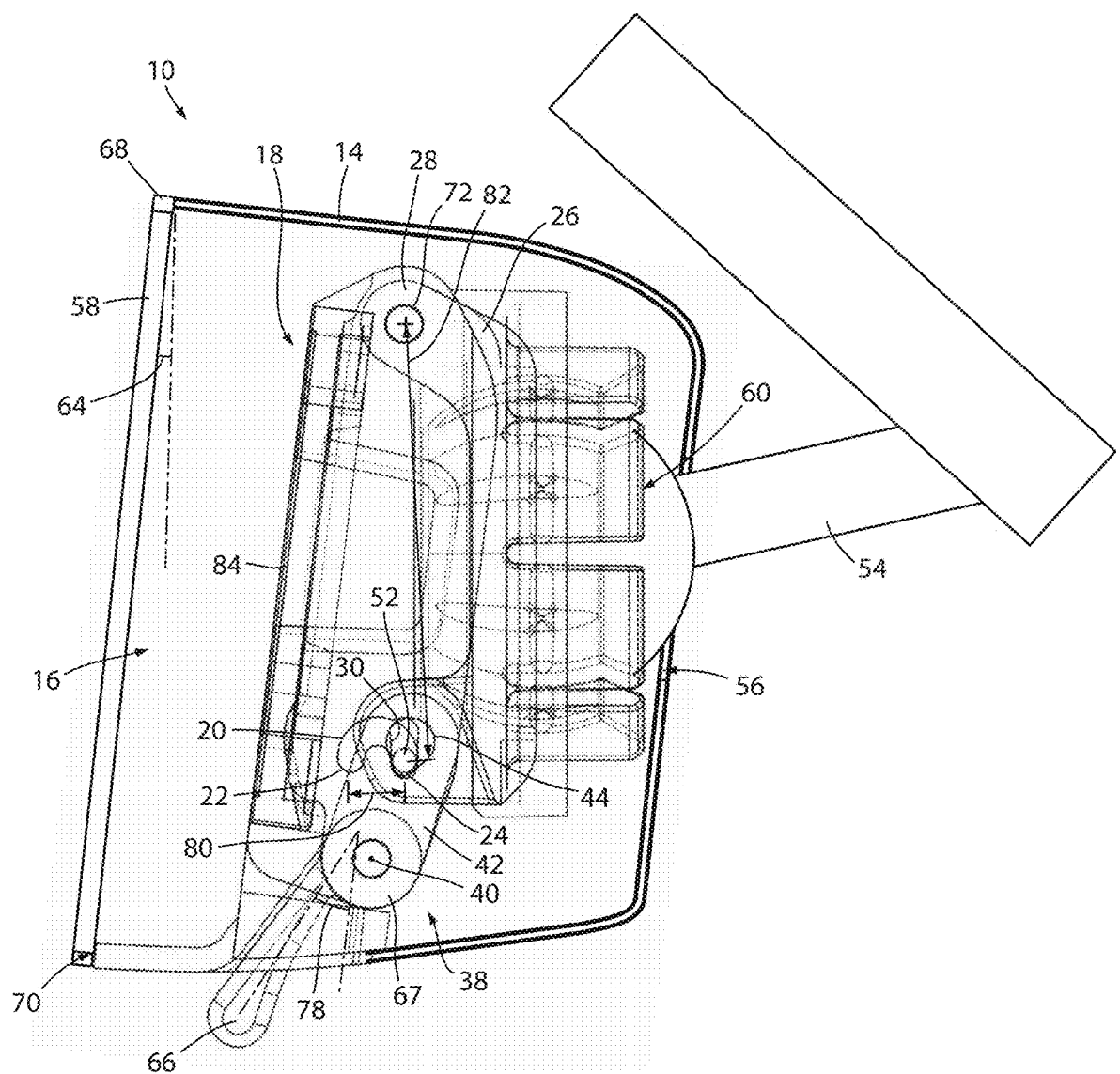
FIG. 10 is a partial section view showing an overlay of the various components of the actuation mechanism in the alternate stable condition.

Referring to FIGS. 1 and 2, as well as FIGS. 7 and 10, housing 14 is shown in the form of a single-piece unit, and can further be made from a single piece of injection molded plastic or the like, although other materials are possible. Substrate 58 can be coupled to housing 14 by way of a bezel 68 or other secondary housing piece to fix substrate 58 over an open side 70 of housing 14. In another example, substrate 58 can be coupled directly to housing 14 over open side 70. In either example, housing 14 is structured so that interior cavity 16 is of a sufficient depth to retain internal structures thereof, including actuation mechanism 18, and other related structures. As shown in FIGS. 7 and 10, mounting plate 26, as described above, is rotatably coupled with housing 14 at first end 28 thereof. Such coupling can be achieved by the use of pin 72 (FIG. 8) to couple first end 28 of mounting plate 26 with opposite ribs 74 (FIG. 4) that are rigidly fixed with respect to housing 14. As illustrated in FIG. 3, mounting plate 26 is rotatably coupled with a securing plate 84 with which ribs 74 are integrally formed. In turn, securing plate 84 is rigidly coupled with substrate 58, such as by coupling with an assembly including portions of substrate 58 associated with an integrated display in assembly therewith or with bezel 68, which may be assembled with and may support substrate 58. In such an assembly, housing 14 may be generally cosmetic and may be assembled, such as by snap-fit or the like, with substrate 58 and/or bezel 68.

Turning now to FIGS. 3-7, actuation mechanism 18 is shown that can achieve motion of an associated rearview mirror housing 14 through rotation of toggle unit 38, as driven by lever 66, for example. Barrel 67 defines the portion of toggle unit 38 that is rotatably fixed within housing 14, such as by coupling with securing plate 84 by way of toggle pin 76. The aforementioned first arm 42 extends from barrel 67 in a direction generally toward mounting plate 26, as described further below. Lever 66 also extends from barrel 67, oppositely from first arm 42, such that manipulation of lever 66 causes rotation of barrel 67. In the illustrated embodiment, toggle unit 38 is an integral structure that may, for example, be a unitary piece of molded plastic or the like. First arm 42, by way of barrel 67 rotation about axis 40 rotates through an angle 78 (FIG. 10) about axis 40 between the first position illustrated in FIGS. 3-7 and corresponding with a downwardly-angled position of mirror 10 (which may correspond to an inactive video display condition or a day mode, depending on the particular implementation of mirror 10), and a second position, illustrated in FIGS. 8-10 and corresponding with an upwardly-angled position of substrate 58 (which may correspond to an active video display condition or a night mode, again depending on the particular implementation of mirror 10).

As illustrated, first track 20 defines first end 22 and second end 24 that are spaced apart in the illustrated horizontal direction by a distance 80 that, relative to the vertical distance 82 between both first end 22 and second end 24 of first track 20 and pin 72, defines the angle 64 between the above-describe first and second stable positions of substrate 58. As further shown in FIGS. 5 and 7, the generally vertical orientation of second track 30 and the aforementioned alignment of first end 32 with the vertical position of the first and second ends 22, 24 of first track 20 is such that movement of pin 52 between first end 22 and second end 24 of first track 20 causes rotation of securing plate 84 with respect to mounting plate 26. The vertical height of second track 30, accordingly accommodates the vertical portion of movement of actuation pin 52 through the arcuate path defined by first track 20. In this manner, the gravitational force on actuation pin 52 can cause actuation pin 52 to be urged toward the one of first end 22 or second end 24 of first track 20 that corresponds to the side of apex 36 on which actuation pin 52 is positioned. In this manner, the arcuate path (which need not be specifically semi-circular) can help urge actuation mechanism 18 to the respective stable positions associated with first end 22 and second end 24 of first track 20 and can help to prevent inadvertent movement of actuation mechanism 18.

As discussed above, the movement of toggle unit 38 through angle 78, such as by manipulation of lever 66, causes movement of actuation pin 52 along first track 20. In particular, when actuation mechanism 18 is in either of the stable positions, with actuation pin 52 being positioned adjacent to either the first end 22 or the second end 24, actuation pin 52 is further positioned adjacent resting end 46 (FIG. 6) of opening 44 in first arm 42. As illustrated in FIGS. 6 and 7, wherein actuation mechanism 18 is shown in the downward stable position, first cam surface 48 is shown as extending away from actuation pin 52 at an angle so as to extend to a widened upper end 86 of opening 44. This geometry is such that rotation of lever 66 in the direction toward substrate 58 engages first cam surface 48 with actuation pin 52. In this manner, the angle of first cam surface 48 with respect to actuation pin 52 is such that the force of first cam surface 48 on actuation pin 52 includes a vertically upward component such that actuation pin 52 is urged away from first end 22 of first track 20 and toward the apex 36 (FIG. 4) thereof. During continued rotation of first arm 42 by rotation of toggle unit 38, the angle of first cam surface 48 decreases relative to the vertical, thereby urging actuation pin 52 over apex 36 and generally toward second end 24, at which point the force of gravity on actuation pin 52 urges actuation pin 52 toward second end 24, with the widened upper end 86 of opening 44 providing clearance for such movement under continued rotation of toggle unit 38 into the forward-most position depicted in FIGS. 8-10 through angle 78. In an embodiment, angle 78 is between about 20° and 45° and in one embodiment about 30°.

As shown in FIG. 10, after movement of toggle unit 38 through angle 78, resulting in the movement of actuation mechanism 18 into the depicted stable position corresponding to positioning of substrate 58 in the upward position, second cam surface 50 (FIG. 6) extends away from actuation pin 52 at generally the same angle as first cam surface 48 (FIG. 9) when in the opposite stable position. In this manner, second cam surface 50 forces actuation pin 52 away from second end 24 of first track 20 and toward first end 22 when lever 66 is rotated away from substrate 58. The angles of first and second cam surfaces 48,50 relative to the vertical when in the first and second stable positions, respectively, can influence the amount of force applied to lever 66 to cause movement of actuation mechanism 18. In particular, a greater angle away from vertical will reduce the force needed, until a point at which cam surfaces 48,50 are unable to achieve movement of actuation pin 52. Conversely, an angle closer to vertical can increase the force needed until binding of the actuation mechanism 18 results. In the illustrated embodiment, cam surfaces 48,50 are positioned within first arm 42 such that they are at an angle of between about 30° and 50° with respect to the vertical when in the first and second stable positions, respectively. In an embodiment, such an angle may be about 40°. Generally, the angle of first and second cam surfaces 48,50 is selected to allow movement of actuation mechanism 18 at a force that is less than the force required to manipulate the configuration of ball and socket coupling 60 so that a force applied on lever 66 does not result in movement of mounting plate 26 with respect to mounting arm 54, while also preventing inadvertent movement of actuation mechanism 18 and providing good tactile feedback on lever 66.

As shown in FIGS. 3-10, toggle unit 38 may be symmetrical so as to include two arms 42 on opposite sides of toggle barrel 67, each including generally identical openings 44 therein. In this manner, securing plate 84 can include two parallel ribs 74 on opposite sides of mounting plate 26, each with generally identical first tracks 20. Similarly, mounting plate 26 can define two generally identical second tracks 30 (or a single, second track 30 located centrally or extending generally through a solid portion of mounting plate 26) adjacent respective ribs 74. Such a configuration allows actuation pin 52 to extend through both openings 44, both first tracks 20, and both second tracks 30 so as to provide balanced force during movement of actuation mechanism 18.

Figure 11:
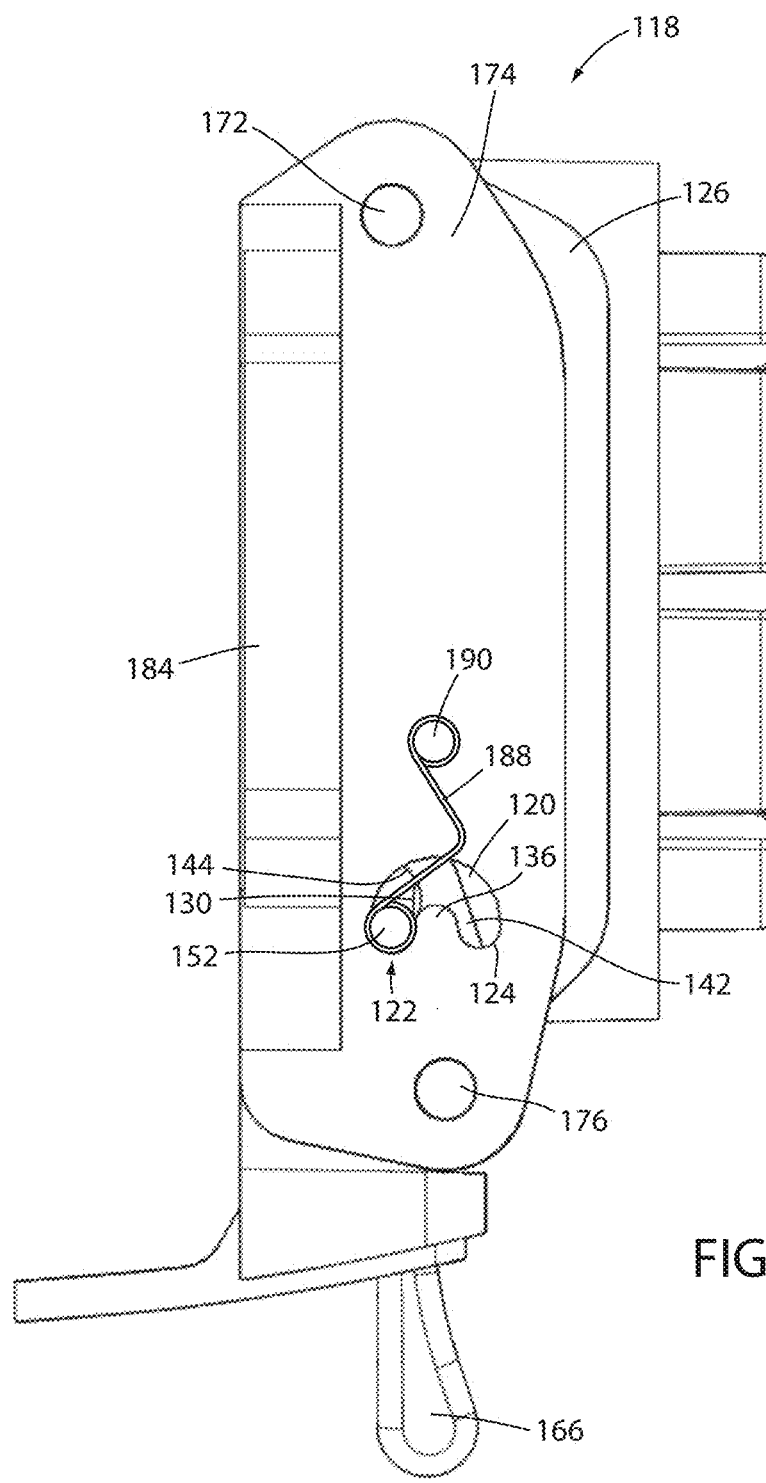
FIG. 11 is a side view of an alternative actuation mechanism.

An alternative embodiment of actuation mechanism 118 is shown in FIG. 11 that is generally similar in construction and operation to actuation mechanism 18 described above and can, accordingly, be used in a rearview mirror assembly similar to mirror 10, also described above. In particular, the arrangement of first track 120, second track 130, and opening 144 are generally similar and achieve the same relative movement of actuation pin 152 to drive movement of securing plate 184 with respect to mounting plate 126 as the analogous elements described above. As shown in FIG. 11, the variation of actuation mechanism 118 now described includes a spring 188 that is on one end thereof coupled with a post 190 that is rigidly coupled with (such as by being integrally formed with) securing plate 184 in a position on rib 174 that is generally vertically above first track 120. Spring 188 is then coupled on an end opposite post 190 to the adjacent end of actuation pin 152 that may be elongated so as to protrude outwardly from first track 120. In this manner, spring 188 can supplement the above-described gravitational force acting on actuation pin 152, under compression, to further urge actuation pin 152 into the end (either first end 122 or second end 124) of first track 120 adjacent the side of apex 136 on which actuation pin 152 is positioned. Further, spring 188 can help retain actuation pin 152 within either first end 122 or second end 124 of first track 120, as applicable, to help prevent inadvertent movement of actuation mechanism 118 and/or to improve the character of the actuation movement and the tactile feel of lever 166.

In a further embodiment shown in FIGS. 12-15, actuation mechanism 218 is also generally similar in construction and operation to actuation mechanism 18 described above and can, accordingly, be used in a rearview mirror assembly similar to mirror 10, also described above. In particular, the arrangement of first track 220, second track, and opening (which are similarly configured to second track 30 and opening 44 depicted in FIGS. 1-10) are generally similar and achieve the same relative movement of actuation pin 252 to drive movement of securing plate 284 with respect to mounting plate 226 as the analogous elements described above. The variation of actuation mechanism 218 can, further, optionally include a spring similar to the one described above with respect to FIG. 11.

Figure 12:
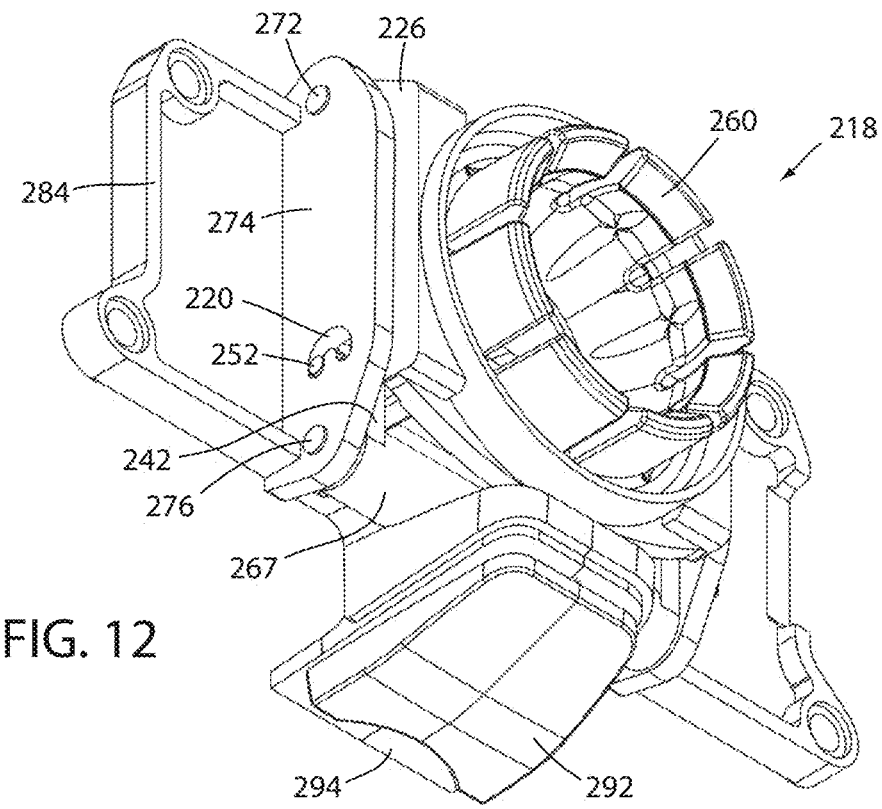
FIG. 12 is a bottom-front perspective view of a further alternative actuation mechanism.
Figure 13:
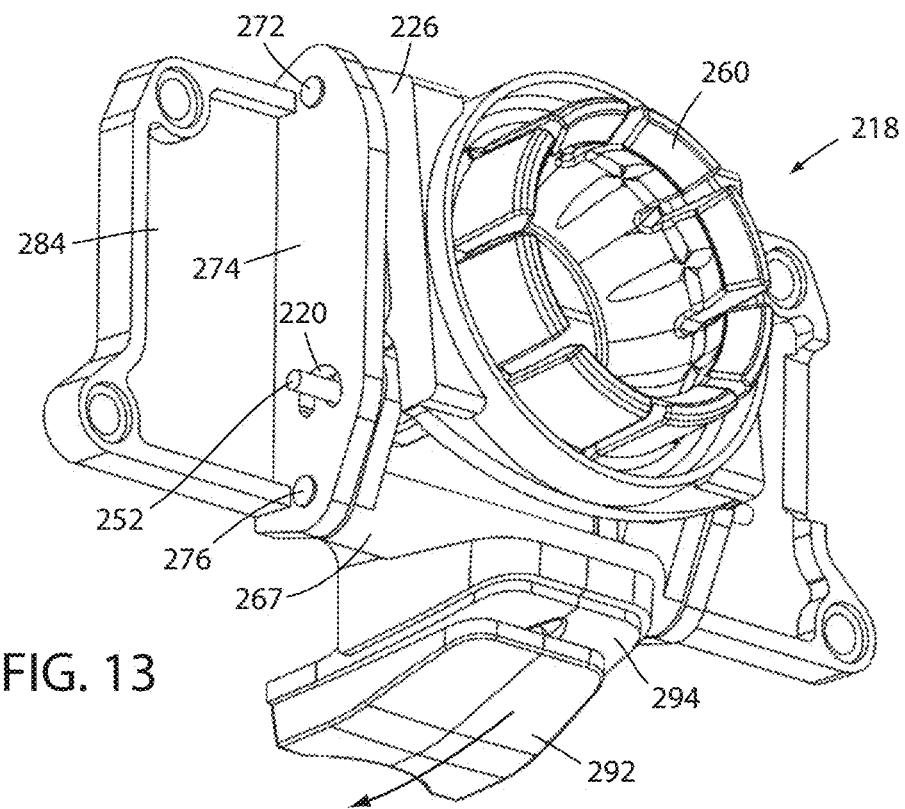
FIG. 13 is a bottom-front perspective view of the actuation mechanism of FIG. 12 in a second stable condition.

As illustrated, actuation mechanism 218 can further include a slide body 292 rotatably coupled with lever 266 to provide an alternative touch-point for user interaction with actuation mechanism 218 that is more similar to a button than a lever. Such an interface may serve to differentiate the user experience of, for example, a full-display variation of an associated mirror assembly from a simple toggle mirror. Further, slide body 292 may be configured to extend over the opening 295 in through which lever 266 extends in either the forward or backward positions thereof. In this manner, a user may push slide body 292 forward (i.e. away from the associated mirror substrate) to move mechanism 218 into the downward stable position (FIG. 12). Similarly the user may pull slide body 292 rearward (i.e. toward the associated mirror substrate) to move mechanism 218 into the upward stable position (FIG. 13).

Figure 14:
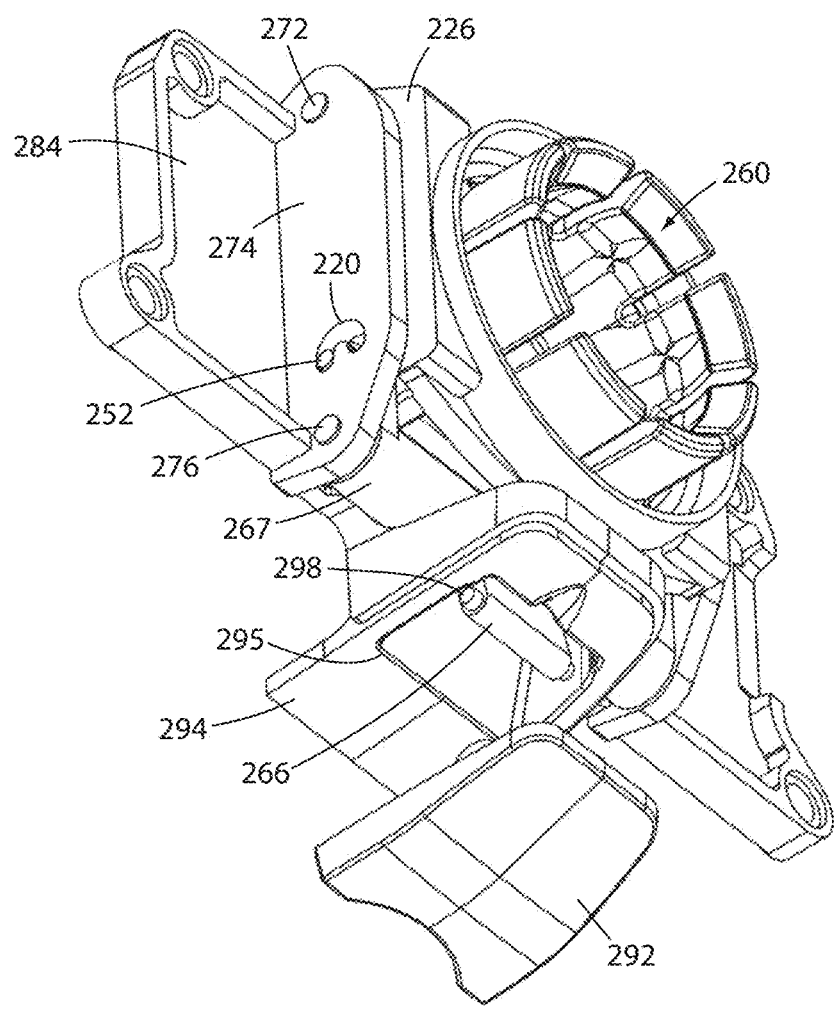
FIG. 14 is a bottom-front perspective, partially-exploded view of the actuation mechanism of FIG. 11.
Figure 15:
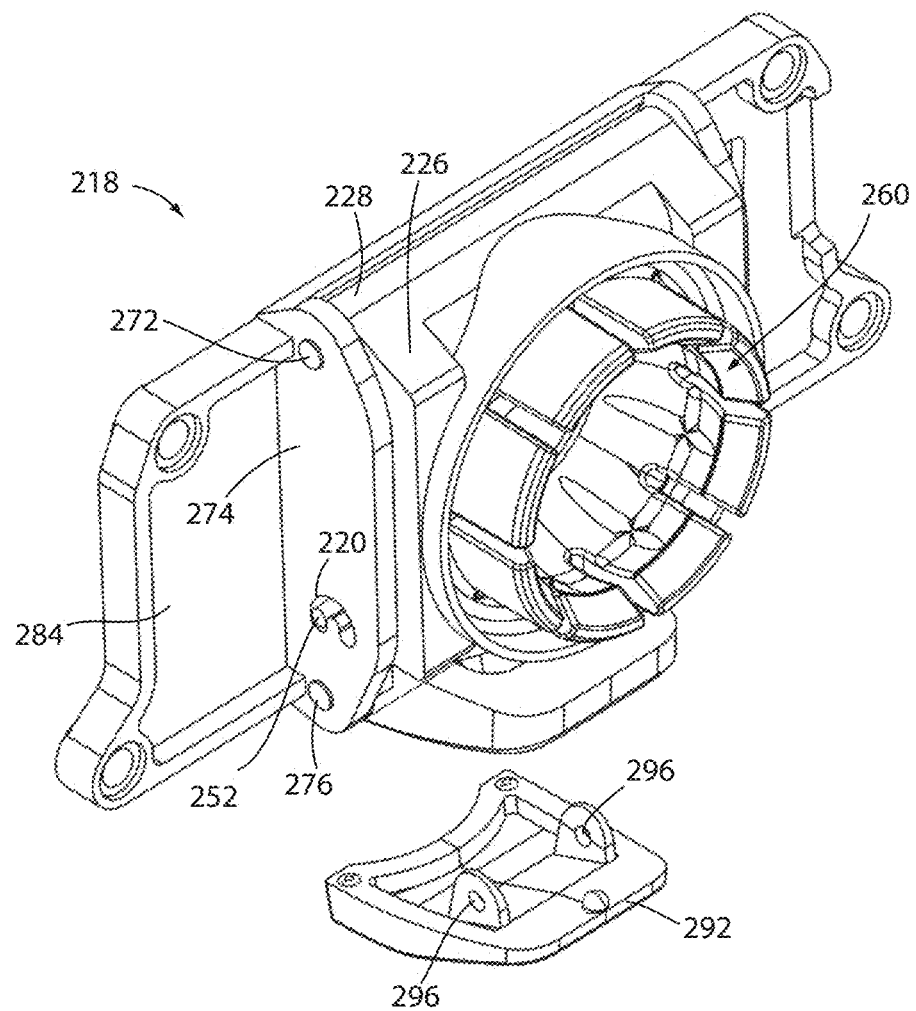
FIG. 15 is a top-front perspective, partially-exploded view of the actuation mechanism of FIG. 11.

As shown in FIGS. 14 and 15, slide body 292 may rotatably couple with a modified implementation of lever 266. The rotatable coupling may allow for slide body 292 to traverse a path that varies somewhat from the path traversed by lever 266 during rotation thereof, and may include concentric openings 296 that can receive protruding posts 298 disposed laterally on the end of lever 266. Further, the exterior surface 294 that is contacted and traversed by slide body 292 during movement thereof can be positioned to provide a path for slide body 292 that accommodates rotation of lever 266, while maintaining slide body 292 in contact therewith by the coupling of slide body 292 with lever 266, and without requiring additional coupling between slide body 292 and the portion of securing plate 284 (or alternatively the associated housing) that defines exterior surface 294.

In a further alternative, the actuation mechanisms 18, 118, and 218 described herein can be used to provide for stable positions and to prevent inadvertent movement out of such stable position in a full-display mirror having motorized movement and, accordingly, lacking a lever. Variations of such a mechanism are described in co-pending, commonly assigned U.S. patent application Ser. Nos. 15/053,252 and 15/053,290, the entire disclosures of which are hereby incorporated by reference herein.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A rearview mirror for a vehicle, comprising:
    a housing defining an interior cavity; and
    an actuation mechanism coupled within the interior of the housing and including:
        a first track fixed with the housing and extending along an arcuate path between first and second ends;
        a mounting plate rotatably coupled within the cavity of the housing at a first end thereof and defining a second track having a first end alternately alignable with the first end and the second end of the first track and a second end alignable with an apex of the arcuate path;
        a toggle unit coupled within the interior cavity of the housing and rotatable about an axis between first and second positions, a first arm extending from the toggle unit and defining an opening therein having a resting end alignable with the first end of the second track and two opposite, facing cam surfaces extending away from the first end; and
        an actuation pin extending through the first track, the second track, and the opening.

2. The rearview mirror of claim 1, wherein:
    the axis of the toggle unit is positioned opposite the first end of the mounting plate with respect to the interior cavity; and
    the pin extends generally parallel with the axis of the toggle barrel and is moveable by rotation of the toggle unit between a first position and a second position that are both positioned between the first end of the mounting plate and the axis of the toggle unit.

3. The rearview mirror of claim 2, wherein:
    when an axis of the pin is in the first position, the pin is located adjacent the first end of the first track; and
    when the axis of the pin is in the second position, the pin is located adjacent the second end of the first track.

4. The rearview mirror of claim 2, wherein:
    when an axis of the pin is in either of the first or second positions, the pin is positioned adjacent the first end of the second track; and
    when the axis of the pin is adjacent the apex of the arcuate path, the pin is positioned adjacent the second end of the second track.

5. The rearview mirror of claim 2, wherein:
    the toggle unit is rotatable with respect to the housing between a first position and a second position respectively corresponding to the first and second positions of an axis of the pin; and
    movement of the toggle unit between the first position and the second position causes rotation of the housing about the first end of the mounting plate through a predetermined angle.

6. The rearview mirror of claim 1, wherein the opening further defines a widened upper end opposite the resting end and extending between the two opposite, facing cam surfaces.

7. The rearview mirror of claim 6, wherein the widened upper end is alignable with the apex of the arcuate path.

8. The rearview mirror of claim 1, wherein the toggle unit further includes a lever rigidly coupled with the first arm and extending oppositely therefrom through the housing.

9. The rearview mirror of claim 8, further including a slide body rotatably coupled with the lever opposite the axis of the toggle barrel and moveable between a first position and a second position along an exterior surface of the housing.

10. The rearview mirror of claim 1, wherein the first track is defined in a rib rigidly coupled with the housing and extending within the interior cavity.

11. The rearview mirror of claim 10, further including a spring coupled between the rib and the pin, wherein the spring is positioned to compress through movement of the pin through the apex of the arcuate path.

12. The rearview mirror of claim 1, further including a mounting arm articulably coupled with the mounting plate and extending through an opening in the housing.

13. A mirror actuation mechanism, comprising:
    a support body defining a first track extending along an arcuate path between first and second ends;
    a mounting plate rotatably coupled with the support body at a first end thereof and defining a second track having a first end alternately alignable with the first end and the second end of the first track and a second end alignable with an apex of the arcuate path;
    a toggle unit rotatably fixed with respect to the support body and rotatable about an axis between first and second positions, a first arm extending from the toggle unit and defining an opening therein having a resting end alignable with the first end of the second track and two opposite, facing cam surfaces extending away from the first end; and
    an actuation pin extending through the first track, the second track, and the opening.

14. The actuation mechanism of claim 13, wherein:
    the axis of the toggle unit is positioned opposite the first end of the mounting plate with respect to the support body; and
    the pin extends generally parallel with the axis of the toggle barrel and is moveable by rotation of the toggle unit between a first position and a second position that are both positioned between the first end of the mounting plate and the axis of the toggle unit.

15. The actuation mechanism of claim 14, wherein:
when an axis of the pin is in the first position, the pin is located adjacent the first end of the first track; and
when the axis of the pin is in the second position, the pin is located adjacent the second end of the first track.

16. The actuation mechanism of claim 14, wherein:
when an axis of the pin is in either of the first or second positions, the pin is positioned adjacent the first end of the second track; and
when the axis of the pin is adjacent the apex of the arcuate path, the pin is positioned adjacent the second end of the second track.

17. The actuation mechanism of claim 14, wherein:
the toggle unit is rotatable with respect to the support body between a first position and a second position respectively corresponding to the first and second positions of an axis of the pin; and
movement of the toggle unit between the first position and the second position causes rotation of the support body about the first end of the mounting plate through a predetermined angle.

18. The actuation mechanism of claim 13, wherein the first track is defined in a rib rigidly coupled with the support body and extending therealong, the actuation mechanism further including:
a spring coupled between the rib and the pin, wherein the spring is positioned to compress through movement of the pin through the apex of the arcuate path.

19. The actuation mechanism of claim 13, wherein the support body is one of coupled with or defined within a housing, the housing defining an opening, the actuation mechanism further including:
a mounting arm articulably coupled with the mounting plate and extending through the opening in the housing.

20. A rearview mirror for a vehicle, comprising:
a substrate having a reflective surface thereon; and
an actuation mechanism including:
a support body coupled with the substrate opposite the reflective surface and defining a first track extending along an arcuate path between first and second ends;
a mounting plate rotatably coupled with the support body at a first end thereof and defining a second track having a first end alternately alignable with the first end and the second end of the first track and a second end alignable with an apex of the arcuate path;
a toggle unit coupled with the support body and rotatable about an axis between first and second positions, a first arm extending from the toggle unit and defining an opening therein having a resting end alignable with the first end of the second track and two opposite, facing cam surfaces extending away from the first end; and
an actuation pin extending through the first track, the second track, and the opening.

\* \* \* \* \*